C. F. BROWN.
ANIMAL FEEDER.
APPLICATION FILED FEB. 21, 1919.

1,346,936.

Patented July 20, 1920.
2 SHEETS—SHEET 1.

INVENTOR.
Charles F. Brown
BY
Rich & H. Manning
ATTORNEY.

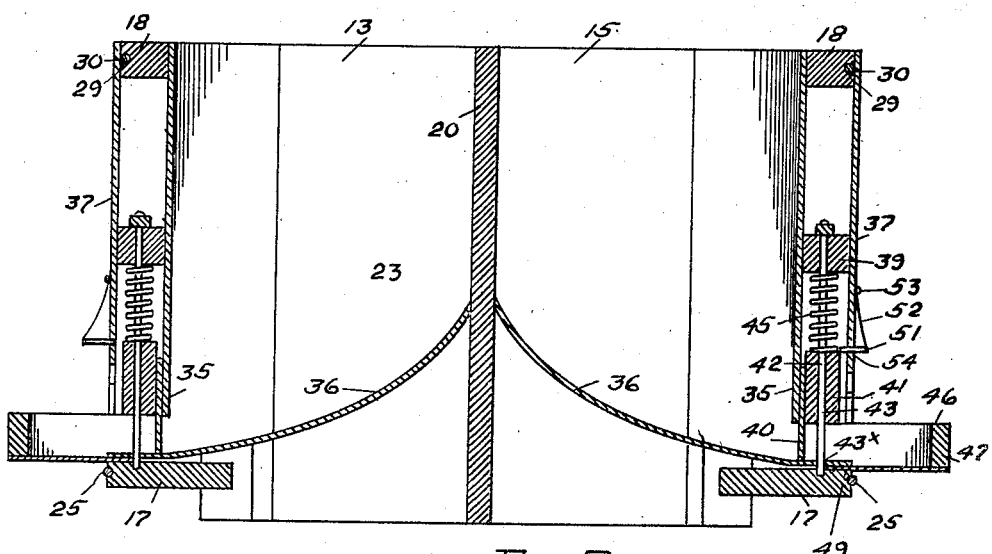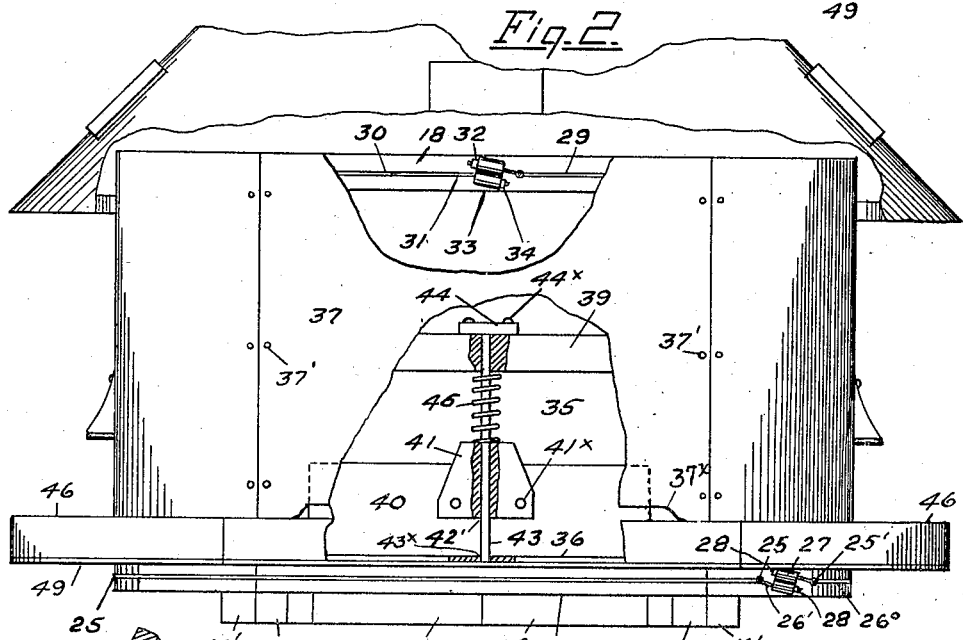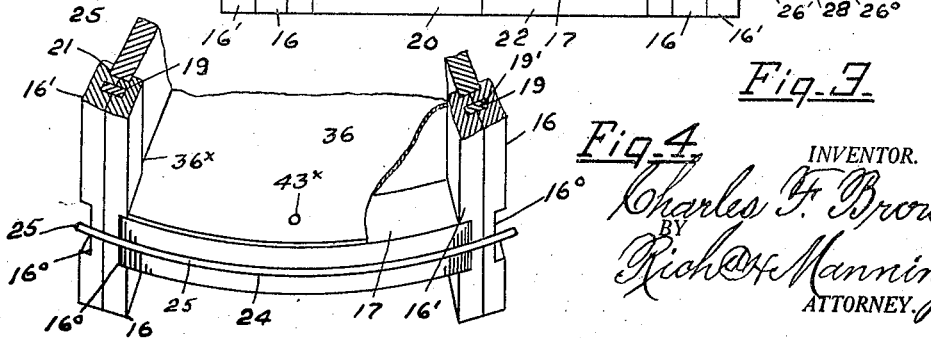

UNITED STATES PATENT OFFICE.

CHARLES F. BROWN, OF SOUTH RIDGE, KANSAS.

ANIMAL-FEEDER.

1,346,936.  Specification of Letters Patent.  Patented July 20, 1920.

Application filed February 21, 1919. Serial No. 278,459.

*To all whom it may concern:*

Be it known that I, CHARLES F. BROWN, a citizen of the United States of America, residing at South Ridge, in the county of Johnson and State of Kansas, have invented certain new and useful Improvements in Animal-Feeders; and I do hereby declare that the following is a full, clear, and exact description of the invention, reference being had to the accompanying drawings, forming a part of this specification.

The object of the invention primarily is a selective feeding device for animals, principally for hogs, wherein the amount and kind of feed most suited to the animal may be determined.

Secondly, to prevent waste of the feed, and govern the supply; and

Thirdly, to provide an animal controlled supply feeder, wherein the feeding operation is performed by the animal.

The invention consists in the novel construction and combination of parts such as will be first fully described and then specifically pointed out in the claims.

In the drawings:—

Fig. 2, is a transverse vertical sectional view of the receptacle or bin showing the contiguous compartments to which the invention is applied.

Fig. 3, is a front view of the bin as seen in Fig. 1, with a portion of the outer side wall of the bin and a portion of the feed trough broken away to show the feed controlling valve and the snubber, the latter being broken away to show the stationary valve guiding rod.

Fig. 4, is a detail view in perspective of a circumferential portion of the base of the bin with the outer covering and inner lining removed to show the inclined bottom of one of the compartments for the feed and the removable section of the bin.

Similar numerals of reference indicate corresponding parts in all the figures of the drawings.

Figure 1:
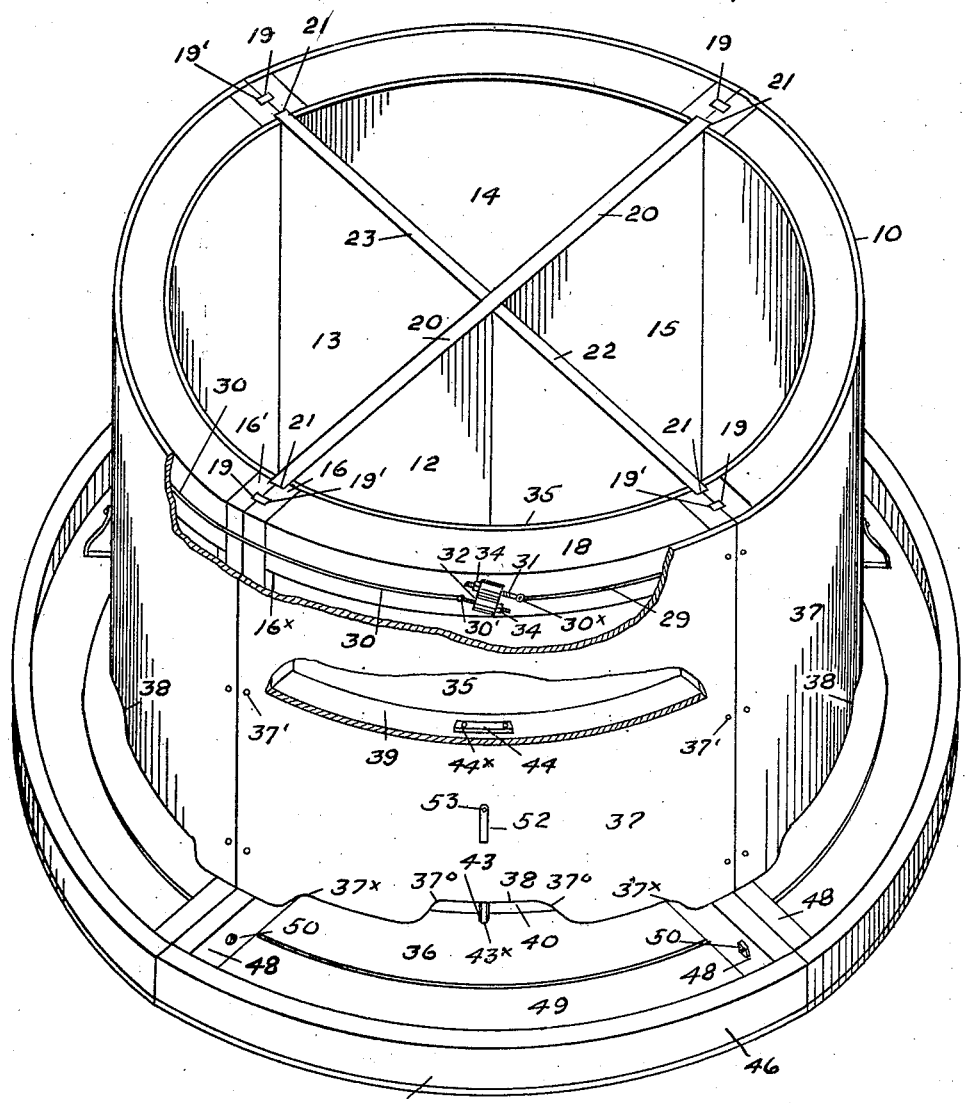
Figure 1, is an isometric view of the feed receptacle or bin showing the contiguous compartments for a variety of feed to which the invention is applied, a portion of the outer covering of the bin being broken away to show the stationary support for the valve guiding rod.
Figure 5:
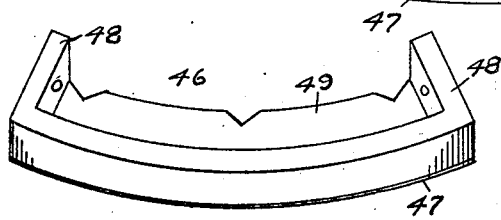
Fig. 5, is a detail view in perspective of one of the removable troughs.

Referring to the drawings:

10 indicates the receptacle or bin which as shown is circular in form and the requisite height, its interior being divided in the manner further described so as to form a series of compartments 12, 13, 14 and 15, for the different kinds of feed it is desired to offer to the animal.

In construction, the frame of the bin is formed of "knock down" sectional parts, said sections being of the same proportions and each a duplicate of the other.

The base of the section of the bin for illustration, within which the compartment 12 is formed, consists of the upright bars or standards 16 and 16', spaced apart from each other the requisite distance to form one of the sections of the bin in the inner surfaces of which standards a short distance upwardly from their lower ends, are formed the notches 16° 16°. In these notches of the respective standards, are fitted the inwardly beveled ends of a horizontal connecting bar 17, the outer surface of which bar is curved outwardly in the arc of a circle, and as illustrated, extending in length a distance equal to one-fourth the circumference of the bin.

In the upper ends of the standards 16 and 16', are notches 16ˣ 16ˣ, respectively, extending from the upper ends and inner surfaces downwardly short distances in which notches are fitted the respective inwardly beveled ends of a transverse connecting bar 18 which is of the same length as the connecting bar 17; the outer surface of which bar 18, is curved outwardly in the same arc of the circle as the outer surface of the connecting bar 17, the inner surface being in a parallel line therewith.

In the outer surfaces of the standards 16 16' are vertical grooves 19' in which are fitted the tongues 19; these tongues entering corresponding grooves in adjoining standards of the adjoining sections of the bin, 20, indicates one of the vertical partitions dividing the interior of the bin into separate compartments and which extends diametrically to the bin from the standards 16 16' of contiguous sections of the bin held by the tongue 19 in alinement with each other to like standards on the reverse side of the bin in the inner surfaces of which contiguous standards are vertical grooves 21, within which the respective ends of the partition 20 extends.

Partitions 22 and 23 extend from the central portion and reverse sides of the partition 20 to the respective standards 16 16' of separate sections of the bin at right angles to said partition 20, thus dividing the spaces between the respective partitions into triangular shaped compartments.

The respective partitions 20, 22 and 23 extend from the horizontal line of the upper surfaces of the connecting bars 18 of the respective sections of the bar downwardly to the horizontal line of the lower ends of the respective standards 16—16' of the sections of the bin.

In the outer circumferential portions of the respective connecting bars 17 of the bin, are grooves 24; these grooves extending within the outer surfaces of the respective standards 16 16'. In the groove 24, is a wire rope or cable 25, having loops 25' 25° at their respective ends. The cable extends around the bin, the loops being secured to the screw-threaded eye bolts 26 26' which extend in reverse directions loosely through the parallel openings in the clamping block 27, nuts 28 on the screw bolts bearing on the reverse ends of the block whereby tension is applied to the cable 25 so as to clamp the sections of the bin firmly together.

In the circumferential portions of the connecting bars 18, is a groove 29 extending within the outer surface of the standards 16 16' in which groove is a wire cable 30 having loops 30'—30° at its respective ends and which are secured to the eye bolts 31 and 32 which are screw-threaded and passed in opposite directions through the clamping block 33, said bolts being provided with nuts 34 which bear on the reverse ends of the block 33, as described, of the nuts 26—26', against the clamping block 27.

Upon the inner curved portion of the compartment 12, is a lining plate 35 secured at its upper end portion to the inner surface of the horizontal connecting bar 18 and extending in a curved line from the inner surface of one partition 20 to the other partition 22 and downwardly to a position a short distance above a line horizontal with the upper surface of the connecting bar 17, as seen in Fig. 2. In the other compartments, 13—14, and 15, are curved lining plates 35, which are the same as the lining plate in the compartment 12, and which extend downwardly the same distance.

36 indicates the bottom plate to the compartment 12, the width of which plate conforms to the width of space between the partition 20 and the partition 22. The narrow triangular shaped upper end of the plate 36 is secured to the said partitions at a point approximately one-half the distance from the lower ends of the partitions toward their upper ends. The forward portion of the partition extends forwardly and downwardly in a curved line upon the upper surface of the horizontal connecting plate 17, and to the curved line of the outer surface of said plate, being notched at 36ˣ on rear of standards 16—16'. In the other compartments 13—14 and 15, of the bin, are bottom plates secured therein which are precisely the same as the bottom plate 36 in the compartment 12.

An outer covering plate 37, to the section of the bin having compartment 12, is secured at the ends to the respective standards 16—16' of said section of the bin by the nails or screws 37'. This outer covering plate is bent upon the outwardly curved surface of the upper connecting bar 18 to the standards 16—16', the end portions of which plate extend from the upper surface of said bar downwardly to a position approximately horizontal with the lower end of the inner lining 35, and from said ends the lower edge of the plate is cut away at 37ˣ in upwardly curved lines thence extended horizontally a short distance toward the central portion of the plate and thence upwardly at 37° 37°, forming a wide notch 38 for the purpose further explained.

A removable covering is provided for each section of the bin, as described, for the section having compartment 12, and precisely like the ends of the separate covering plates abutting contiguous ends of adjacent plates. Between the outer covering plate 37, and the inner lining plates 35, to the section of the bin having compartment 12, is a horizontal curved bar 39, secured rigidly at its ends to the respective standards 16—16' at points approximately intermediate the upper and lower connecting bars 18 and 17 respectively.

The feed delivering device consists of a valve plate 40, which controls the outward passage of the feed from the compartment 12. This valve plate extends in length from the inner surface of the standard 16 to the inner surface of the standard 16' of the section having compartment 12, and in a closed position from the bottom plate 36 a short distance upwardly and in contact with the outer surface of the lining plate 35, and is curved in the arc of a circle of said lining plate.

Upon the outer surface of the valve plate 40, at a point equi-distant from its ends and above a line equi-distant from the upper and lower horizontal edges of the valve plate, is connected, by the rivets 41ˣ, the snubbing block 41. This block is of considerable thickness and extends a short distance upwardly above the line of the upper surface of the valve plate 40, and is directly opposite the notched portion 38 of the outer covering 37 to the section of the bin, the lower surface of the block 41 being at right angles to the outer face of the valve.

Through the block 41 extends a vertical opening 42, and in said opening is a stationary guide rod 43, the upper end of which rod extends upwardly through the stationary bar 39 and is secured fixedly to a horizontal plate 44 secured by the screws 44ˣ to the upper surface of said bar. The lower end of said rod extends downwardly through an opening 43ˣ in the bottom plate 36, and a short distance within the connecting bar 17 to the respective standards, see Figs. 2 and 4.

Extending around the stationary rod 43, is a spiral compression spring 45, one end of which spring bears against the lower surface of the stationary bar 39 and the other end upon the upper end of the snubbing block 41.

Between the outer covering plate and inner lining plates, to the other sections of the bin having compartments 13, 14 and 15, are arranged like valve plates 40 and provided with snubbing blocks and operated in precisely the same manner as described of the section of the bin having compartment 12.

46 indicates the separate individual detachable troughs drawers for each section of the circular bin, whereby any trough may be removed for sanitary purposes.

The individual trough consists of the outwardly curved outer side member 47, and end members 48 which are inclined inwardly so that the end members will abut the inwardly inclined end members of contiguous troughs upon contiguous sections.

The trough is provided with a bottom plate 49, preferably of sheet metal, and upon attaching the trough to the section of the bin, this plate slides upon the upper surface of the lower connecting bar 17, and beneath the forward portion of the bottom plate 36 and is held by said plate in position, and from which position it may be easily withdrawn. The troughs are connected removably at their ends by bolts 50. The compartments 12, 13, 14 and 15 of the bin, are supplied with animal feed of different kinds, one compartment having cracked corn, another compartment a mixed feed, and another a mash, and all of which will be conducted upon the inclined plane of the bottom members 36 to the valve plates 40.

The rooting tendency of swine in a search for food, is made use of in the present invention, and as soon as the swine scent the feed in the compartments of the bins, the instinct of the animal, when the trough is approached, to find an opening to the compartment, leads the animal to extend his nose within the space beneath the notch 38 in the outer covering 37, and encounter the snubbing block 41 on the valve 40. The nose of the animal, which must enter the notch 38 beneath the snubbing block, will be found to yield to an upward pressure on the lower surface of the block, raising both ends of the valve 40 on the guide rod 43 a slight distance to permit a small quantity to pass the valve into the trough. This movement of the valve will insure a repetition thereof with a consequent repetition in the discharges and instant cut off of the feed, and with more vigorous attempts to raise the valve, the flow of the feed in small quantities follow without waste until sufficient feed has entered the trough to satisfy hunger. The nose energy applied by the swine to one snubbing block, will induce corresponding action upon each of the snubbing blocks to the valves 40 to the other compartments, from which the feed will be released in like manner. The amount of feed consumed, as well as the kind, will then be observed and such replenishing of the compartments will be made as determined by the quantity remaining in each compartment.

Furthermore the quantity of feed released by the swine will never be excessive, so as to cause waste, as the swine will cease to operate the valve 40 as soon as a sufficient quantity reaches the trough, the rule of supply and demand being made methodical in this instance.

The valve 40 is held by the stationary guide rod 43 against rocking movement and prevents the raising of one end of the valve 40 without raising the other, and hence no escape of feed will be greater at one end than at the other, the regulation or equalized movement of the valve being essential otherwise the upward movement of the ends of the valve would not afford the closure so as to graduate the delivery of the feed. I am aware that animal operated feed valves to bins have been made to close by gravity, but such valves are inoperative as a feed cut-off, for the reason that the weight or gravity of the valve is easily overcome by the animal and the upward uncontrolled movement of the valve, and full discharge of the feed, is not otherwise prevented or governed. Again, the feed will clog the opening between the lower surface of the valve and the bottom of the bin and keep the valve partially raised, hence no cut-off of the feed is effected. In a bin in which the rod is movable with the valve, and held in guides above, the weight of the feed acts to cause the rod to bind and prevent the upward movement of the valve; and where the valve is supported by rods at each end, the animal operating on the snubber at one end checks the upward movement of the other end.

I do not employ division rods to keep the animals apart for the reason that in a circular bin, there is room for the crowding, if this should happen, without being injured by obstructions in front of the feed valves.

The ordinary plank valve could not be applied to a circular bin and made to operate, as the valve is required to be made of metal and curved to close the discharge opening. The stationary rod should pass through the snubbing block in order to accelerate the gravity of the valve plate and to effect, with the compression of the spring, a regulation by the increasing resistance to the raising of the valve by animal operation, and prevent any binding of the valve by the valve guiding elements.

The troughs 46 prevent the fed from becoming mixed or moved from one trough to another, and being located above the ground are made sanitary at all times.

Should it be desirable to prevent the removal of the feed from any compartment of the bin, a locking pin 51 is provided, which is attached to the lower end of a strap 52 and pivoted at 53 at its upper end, to the outer side of the covering plate 37. The locking pin is extended through an opening 54 in the plate 37, and upon the surface of the upper end of the snubbing block 41, when the valve 40 is in a downward closed position. The bin may be provided with a roof of any preferred construction and not necessary to be shown.

The features of the invention are applicable to other forms of bins other than that shown, the present form being such that the swine may be feeding from all of the compartments at once. This construction is also convenient for a knock-down structure facilitating transportation.

Such modifications of the invention may be employed as are within the scope of the appended claims.

Having fully described my invention, what I now claim as new and desire to secure by Letters Patent, is:—

1. In a feeding receptacle, the combination with a compartment for the feed, having a discharge opening and a vertically movable valve plate having its ends parallel with the sides of said opening, a vertical stationary guide rod located equi distant from the ends of said valve plate and acting to hold the valve against rocking movement, a snubbing block connected with said valve plate and slidingly mounted, and a compression spring on said rod bearing upon the upper end of the snubbing block.

2. In a feeder for animals, a bin having a series of compartments for the feed, and feed discharge openings to said compartments, a bottom plate to each compartment, valves to said openings, and individual removable troughs having end members, and horizontal bottom members and guiding devices therefor extending beneath and in contact with the bottom plates to said compartments.

CHARLES F. BROWN.

Witnesses:
MARGUERITE BROWDER,
MINNIE G. LONG.